United States Patent
Oh et al.

(10) Patent No.: US 8,543,719 B2
(45) Date of Patent: Sep. 24, 2013

(54) SYSTEM AND METHOD FOR MANAGING XDM SERVICE INFORMATION

(75) Inventors: Jae-Kwon Oh, Seoul (KR); Wuk Kim, Gwacheon-si (KR); Sang-Kyung Sung, Seoul (KR)

(73) Assignee: Samsung Electronics Co., Ltd (KR)

( * ) Notice: Subject to any disclaimer, the term of this patent is extended or adjusted under 35 U.S.C. 154(b) by 1225 days.

(21) Appl. No.: 11/497,213

(22) Filed: Aug. 1, 2006

(65) Prior Publication Data

US 2007/0043692 A1  Feb. 22, 2007

(30) Foreign Application Priority Data

Aug. 19, 2005 (KR) ........................ 10-2005-0076490

(51) Int. Cl.
*G06F 15/16* (2006.01)
*G06F 17/00* (2006.01)
*G06F 17/30* (2006.01)
*G06F 9/44* (2006.01)
*H04H 20/71* (2008.01)
*H04W 4/00* (2009.01)

(52) U.S. Cl.
CPC ............... *G06F 15/16* (2013.01); *G06F 17/00* (2013.01); *G06F 17/30* (2013.01); *H04H 20/71* (2013.01); *H04W 4/00* (2013.01); *G06F 9/44* (2013.01)
USPC ........... 709/230; 709/203; 709/219; 715/234; 715/236; 715/744; 707/631; 707/694; 707/705; 717/173; 717/175; 455/518; 455/422.1; 455/301

(58) Field of Classification Search
USPC ............ 707/1–2, 10, 100, 102, 103 X–103 Z, 707/200, 601, 802, 811, 807; 715/234, 760, 715/239; 717/116, 152, 171, 176; 455/517–519, 413, 556.2
See application file for complete search history.

(56) References Cited

U.S. PATENT DOCUMENTS

| | | | | |
|---|---|---|---|---|
| 6,865,398 | B2 * | 3/2005 | Mangal et al. | 455/552.1 |
| 7,280,502 | B2 * | 10/2007 | Allen et al. | 370/329 |
| 2002/0035621 | A1 * | 3/2002 | Zintel et al. | 709/220 |

(Continued)

FOREIGN PATENT DOCUMENTS

| | | | |
|---|---|---|---|
| EP | 1515571 | * | 3/2005 |
| EP | 1862932 A1 | * | 12/2007 |

(Continued)

OTHER PUBLICATIONS

Yu-Ting Zhang et al "Inter-working between SIMPLE and IMPS-",ScienceDirect Available online Jan.30, 2007 pp. 584-600.*

(Continued)

*Primary Examiner* — Srirama Channavajjala
(74) *Attorney, Agent, or Firm* — The Farrell Law Firm, P.C.

(57) ABSTRACT

Disclosed is a system and method for managing XDM (XML Document Management) service information to improve management efficiency for OMA (Open Mobile Alliance) service information. The apparatus includes a controller for creating a shared User Resource Identifier (URI), and using a value created by the controller as a static value to be used as a newly-created reference handle for shared service information referred to by service information. The newly-created value is set as an unchanged value (i.e., it remains static until a corresponding element vanishes), thereby preventing signaling overhead, compatibility degradation, and resource waste due to modification of the shared service information.

20 Claims, 5 Drawing Sheets

(56) References Cited

U.S. PATENT DOCUMENTS

| | | | |
|---|---|---|---|
| 2003/0236903 A1* | 12/2003 | Piotrowski | 709/231 |
| 2004/0107236 A1 | 6/2004 | Nakagawa et al. | |
| 2004/0125956 A1* | 7/2004 | Heiderscheit et al. | 380/258 |
| 2004/0224710 A1* | 11/2004 | Koskelainen et al. | 455/518 |
| 2005/0055397 A1* | 3/2005 | Zhu et al. | 709/200 |
| 2005/0055453 A1* | 3/2005 | Zhu | 709/230 |
| 2005/0213537 A1* | 9/2005 | Ingimundarson et al. | 370/329 |
| 2005/0228847 A1* | 10/2005 | Hayes, Jr. | 709/200 |
| 2005/0232175 A1* | 10/2005 | Draluk et al. | 370/310 |
| 2005/0261015 A1* | 11/2005 | Schwagmann et al. | 455/518 |
| 2006/0053208 A1* | 3/2006 | Laurila et al. | 709/206 |
| 2006/0140173 A1* | 6/2006 | Hoover | 370/352 |
| 2006/0155726 A1* | 7/2006 | Krasun et al. | 707/100 |
| 2006/0230395 A1* | 10/2006 | Paul et al. | 717/173 |
| 2006/0270404 A1* | 11/2006 | Tuohino et al. | 455/432.3 |
| 2007/0010275 A1* | 1/2007 | Kiss | 455/521 |
| 2007/0255714 A1* | 11/2007 | Laurila et al. | 707/9 |
| 2008/0046482 A1* | 2/2008 | Oh et al. | 707/203 |

FOREIGN PATENT DOCUMENTS

| | | | |
|---|---|---|---|
| JP | 2004-341849 | | 12/2004 |
| JP | 2005-020583 | | 1/2005 |
| JP | 2005-094638 | | 4/2005 |
| WO | WO 01/95155 | | 12/2001 |
| WO | WO 02/075549 | | 9/2002 |
| WO | WO 2006/027407 | * | 3/2006 |
| WO | WO 2006/043082 | * | 4/2006 |
| WO | WO 2008020717 A1 | * | 2/2008 |

OTHER PUBLICATIONS

HP OpenCall XML Document Management Server software Data Sheet,4AA0-4758ENW, Rev. 1, Jul. 2006 pp. 1-6.*
Nilanjan Banerjee et al. "Analysis of SIP-based mobility management in 4G wireless networks",Computer Communications 27 (2004) 697-707.*
HP OpenCall XML Document Management Server software, Data sheet,4AA0-4758ENW, Rev. 1, Jul. 2006, 6 pages.*
James Irwin, "Digital Rights Management: The Open Mobile Alliance DRM Specifications",Elsevier Ltd,Information Security Technical Report. vol. 9, No. 4, 2004, pp. 22-31.*
Peter Kim et al. "IMS-based Push-to-Talk over GPRS/UMTS", WCNC 2005, pp. 2472-2477.*
PoC XDM Specification, Draft Version 1.0, Feb. 2, 2005, Open Mobile Alliance.
Resource List Service (RLS) XDM Specification, Candidate Version 1.0, Jun. 28, 2005, Open Mobile Alliance.
Shared XDM Specification, Candidate Version 1.0, Jun. 28, 2005, Open Mobile Alliance.
J. Rosenberg, Cisco Systems, The Extensible Markup Language (XML) Configuration Access Protocol (XCAP), Jun. 11, 2005.
J. Rosenberg, Cisco Systems, The Extensible Markup Language (XML) Formats for Representing Resource Lists, Feb. 7, 2005.
XML Document Management (XDM)Specification, Candidate Version 1.0, Jun. 28, 2005, Open Mobile Alliance.
Shared XDM Specification, Candidate Version 1.0, Feb. 4, 2005, Open Mobile Alliance.
XML Document Management (XDM) Specification, Candidate Version 1.0, Apr. 15, 2005, Open Mobile Alliance.
JiHyun Wang et al., "A ODBMS-based XML Document Repository System", Electronics and Telecommunications Research Institute, vol. 28, No. 2, 2001.

* cited by examiner

SYSTEM AND METHOD FOR MANAGING XDM SERVICE INFORMATION

PRIORITY

This application claims the priority under 35 U.S.C. §119 to an application entitled "SYSTEM AND METHOD FOR MANAGING XDM SERVICE INFORMATION" filed in the Korean Intellectual Property Office on Aug. 19, 2005 and assigned Serial No. 2005-76490, the contents of which are incorporated herein by reference.

BACKGROUND OF THE INVENTION

1. Field of the Invention

The present invention relates to a system and method for managing XDM (XML Document Management) service information used to provide Open Mobile Alliance (OMA) service.

2. Description of the Related Art

As mobile telecommunication technologies have developed and communication networks have become more common, users have increasingly demanded various additional mobile telecommunication services. Accordingly, Open Mobile Alliance (OMA) services such as Push-to-Talk over Cellular (PoC), Instant Messaging (IM) and the like have been suggested to Service information is required to provide various OMA services. The service information may be classified into information shared among several OMA services and information used only by specific OMA service. The service information shared among several OMA services is stored in an OMA shared XML document management system (XDMS), hereinafter referred to as a "shared XDMS."

Figure 1:
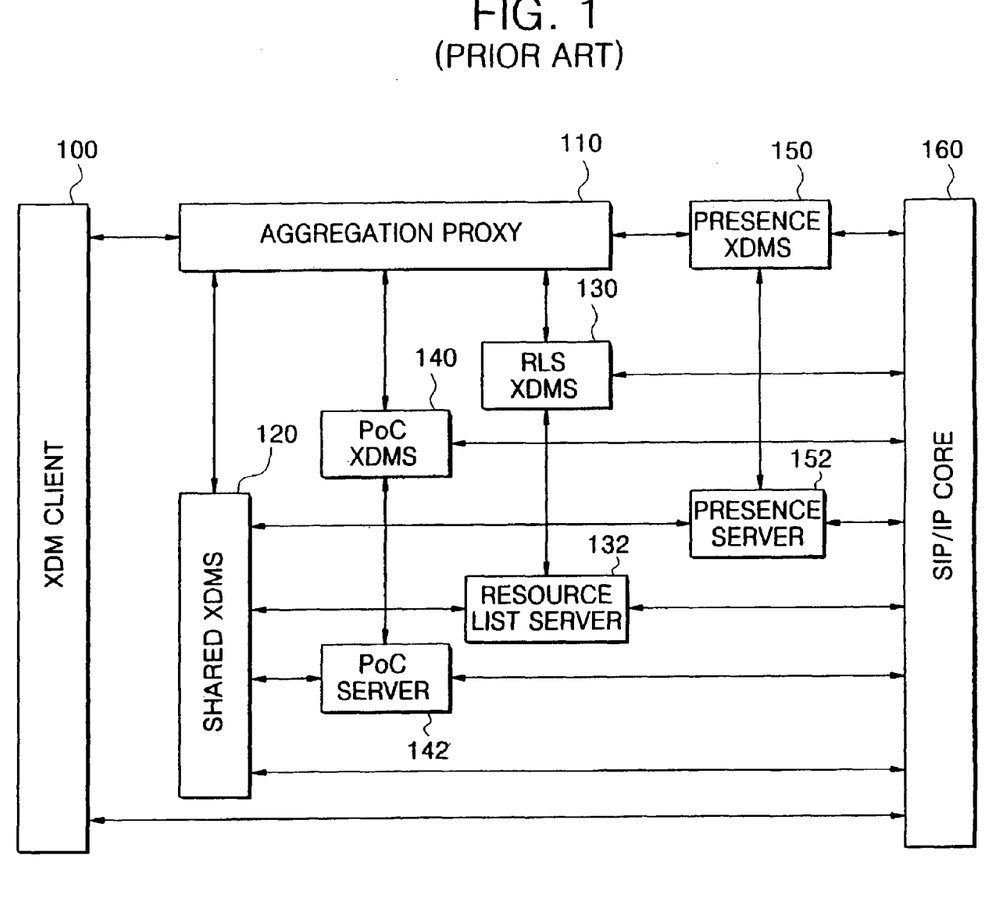
FIG. 1 is a block diagram illustrating conventional presence architecture for managing OMA service information.

FIG. 1 is a block diagram illustrating group management and presence architecture for managing OMA service information. Referring to FIG. 1, the group management and presence architecture may include an XDM client 100, an aggregation proxy 110, a shared XDMS 120, a resource list server (RLS) XDMS 130, a resource list server (RLS) 132, a PoC XDMS 140, a PoC server 142, a presence XDMS 150, a presence server 152, and an SIP/IP (Session Initiation Protocol/Internet Protocol) core 160.

The XDM client 100 is for using group information. The XDM client 100 is a service requester embedded in a user terminal and connected to XDM servers either through Aggregation Proxy 110 using HTTP, or through SIP/IP core 160 which is a core network supporting SIP and IP multimedia. The XDM client 100 can obtain and process group list information for a group call service. The XDM client is defined in an OMA standard.

The XDM servers (XDMSs) 120, 130, 140, and 150 are used for group list service. These servers are also defined in the OMA standard. The XDM servers (XDMSs) 120, 130, 140, and 150 may be classified into the RLS XDMS 130, the PoC XDMS 140, and the presence XDMS 150 for providing specific OMA service, and the shared XDMS 120, which may be shared with other service enablers.

A user can input information about groups and group members to the XDMS 120, 130, 140 and 150 using the XDM client 100. Herein, the term user will be regarded as having the same meaning as XDM client, unless mentioned otherwise.

When a group list related request is received from the user, the aggregation proxy server 110 routes the request to the XDMSs 120, 130, 140, and 150 according to a suitable rule.

The RLS 132 utilizes a presence information group maintained in RLS XDMS 130, to subscribe the presence information of the group members. The PoC server 142 utilizes a PoC group information maintained in PoC XDMS 140, to manage a PoC session. The presence server 152 manages current state or presence information of users.

The SIP/IP CORE 160 is connected to the XDMSs 120, 130, 140, and 150, the PoC server 142, and the RLS 132 to provide OMA service.

As described above, the RLS XMDS 130 and the PoC XDMS 140 store RLS service information and PoC service information, respectively. The shared XDMS 120 stores shared service information which is used for several OMA services. The PoC service information and the RLS service information are generally created to refer to the shared service information, which is stored in the shared XDMS 120. The shared XDMS 120 may also store service information used only for the XDMS. This service information is also created to refer to the shared service information.

A representative example of the service information includes a uniform resource identifier (URI) list. The URI list stored in the shared XDMS 120 and used for a plurality of OMA services is called a shared URI list.

The shared URI lists typically have a resource-list format corresponding to an XCAP_LIST [XCAP (XML Configuration Access Protocol)-list].

Tables 1 and 2 below, illustrate XML schema for a resource-list, as specified in "The Extensible Markup Language (XML) Formats for Representing Resource List", J. Rosenberg, Feb. 7, 2005, herein after referred to as [XCAP_List].

TABLE 1

XML schema for resource-list; part 1 [XCAP_List]

```
<?xml version="1.0" encoding="UTF-8"?>
  <xs:schema targetNamespace="urn:ietf:params:xml:ns:resource-lists"
    xmlns="urn:ietf:params:xml:ns:resource-lists"
    xmlns:xs="http://www.w3.org/2001/XMLSchema"
    elementFormDefault="qualified" attributeFormDefault="unqualified">
    <xs:import namespace="http://www.w3.org/XML/1998/namespace"
      schemaLocation="http://www.w3.org/2001/xml.xsd"/>
    <xs:complexType name="listType">
    <xs:sequence>
      <xs:element name="display-name" type="display-nameType"
  minOccurs="0"/>
      <xs:sequence minOccurs="0" maxOccurs="unbounded">
        <xs:choice>
          <xs:element name="list">
            <xs:complexType>
              <xs:complexContent>
                <xs:extension base="listType"/>
              </xs:complexContent>
            </xs:complexType>
          </xs:element>
          <xs:element name="external" type="externalType"/>
          <xs:element name="entry" type="entryType"/>
          <xs:element name="entry-ref" type="entry-refType"/>
          <xs:any namespace="##other" processContents="lax"
            minOccurs="0"
            maxOccurs="unbounded"/>
        </xs:choice>
      </xs:sequence>
      <xs:any namespace="##other" minOccurs="0"
        maxOccurs="unbounded"/>
    </xs:sequence>
    <xs:attribute name="name" type="xs:string" use="optional"/>
    <xs:anyAttribute namespace="##other"/>
  </xs:complexType>
  <xs:complexType name="entryType">
    <xs:sequence>
```

TABLE 1-continued

XML schema for resource-list; part 1 [XCAP_List]

```
    <xs:element name="display-name" minOccurs="0">
      <xs:complexType>
        <xs:simpleContent>
          <xs:extension base="display-nameType"/>
        </xs:simpleContent>
      </xs:complexType>
    </xs:element>
    <xs:any namespace="##other" processContents="lax"
minOccurs="0"
      maxOccurs="unbounded"/>
  </xs:sequence>
  <xs:attribute name="uri" type="xs:anyURI" use="required"/>
  <xs:anyAttribute namespace="##other"/>
</xs:complexType>
```

TABLE 2

XML schema for resource-list; part 2 [XCAP_List]

```
<xs:complexType name="entry-refType">
  <xs:sequence>
    <xs:element name="display-name" type="display-nameType"
minOccurs="0"/>
      <xs:any namespace="##other" minOccurs="0"
      maxOccurs="unbounded"/>
  </xs:sequence>
  <xs:attribute name="ref" type="xs:anyURI" use="required"/>
  <xs:anyAttribute namespace="##other"/>
</xs:complexType>
<xs:complexType name="externalType">
  <xs:sequence>
    <xs:element name="display-name" type="display-nameType"
minOccurs="0"/>
      <xs:any namespace="##other" minOccurs="0"
      maxOccurs="unbounded"/>
  </xs:sequence>
  <xs:attribute name="anchor" type="xs:anyURI"/>
  <xs:anyAttribute namespace="##other"/>
</xs:complexType>
<xs:element name="resource-lists">
  <xs:complexType>
    <xs:sequence maxOccurs="unbounded">
      <xs:element name="list" type="listType"/>
    </xs:sequence>
  </xs:complexType>
</xs:element>
<xs:complexType name="display-nameType">
  <xs:simpleContent>
    <xs:extension base="xs:string">
      <xs:attribute ref="xml:lang"/>
    </xs:extension>
  </xs:simpleContent>
</xs:complexType>
</xs:schema>
```

A shared URI list created according to the schema of Tables 1 and 2 is stored in the form of a resource-list document in a user directory for a user who possesses a shared URI list in the shared XDMS 120.

Table 3 shows an example of a resource-list document having the name friends.xml.

TABLE 3

Example resource-list document in Shared XDMS, named friends.xml

```
<?xml version="1.0" encoding="UTF-8"?>
  <resource-lists xmlns="urn:ietf:params:xml:ns:resource-lists"
        xmlns:xsi="http://www.w3.org/2001/XMLSchema-instance">
    <list name="my_friends">
      <display-name>My Friends</display-name>
      <entry uri="sip:brian@example.com">
        <display-name>Brian Oh</display-name>
      </entry>
      <entry uri="sip:alex@example.com">
        <display-name>Alex Cho</display-name>
      </entry>
    </list>
    <list name="other_friends">
      <display-name>Other Friends</display-name>
      <entry uri="sip:joe@example.com">
        <display-name>Joe Smith</display-name>
      </enrty>
      <entry uri="sip:nancy@example.com">
        <display-name>Nancy Gross</display-name>
      </entry>
    </list>
  </resource-lists>
```

The location of the resource-list document stored in the shared XDMS 120 is represented by an XCAP URI of [XCAP Root URL]/[AUID]/users/[XUI]/[XML document name] format, details of which are described in "XML Document Management (XDM) Specification", Version 1.0, Open Mobile Alliance™, OMA-TS-XDM_CORE-V1_0, herein after referred to as [XDM_Core]. This format is called a document selector because it specifies a location of an XML document. The XCAP Root URL indicates a top-level entity of all XDMSs, the AUID (application ID) indicates corresponding service, and the XUI (XCAP user identity) indicates an owner of the document. The AUID for a resource-list defined in [Shared_XDM] is "resource-lists." Accordingly, a document selector of a resource-list document becomes [XCAP Root URL]/resource-lists/users/[XUI]/[XML document name].

For example, assuming that [XCAP Root URL] to which the shared XDMS belongs is http://xcap.example.com/services, and an owner of a resource-list document friends.xml in Table 3 is Jay, whose XUI is sip:jay@example.com, a document selector of the friends.xml document is http://xcap.example.com/services/resource-lists/users/sip:jay@example.com/friends.xml. This document selector is used as an XCAP URI specifying the location of the document.

A location of each element stored in the resource-list document is represented by a combination of a document selector and a node selector. A location representation format is [document selector]/~~/[node selector]. The node selector represents a location of an element corresponding to a described condition using a certain method.

Table 4 illustrates code used to define the node selector as specified in "The Extensible Markup Language (XML) Configuration Access protocol (XCAP)", J. Rosenberg, Jun. 11, 2005, hereafter referred to as [XCAP].

TABLE 4

Advanced BNF definition for node selector [XCAP]

| | |
|---|---|
| node-selector | = element-selector ["/" attribute-selector] |
| element-selector | = step *( "/" step) |
| step | = by-name / by-pos / by-attr / by-pos-attr |
| by-name | = NameorAny |
| by-pos | = NameorAny "[" position "]" |

TABLE 4-continued

Advanced BNF definition for node selector [XCAP]

| | |
|---|---|
| position | = 1*DIGIT |
| by-attr | = NameorAny "[" "@" att-name "=" <'> att-value <'> "]" |
| by-pos-attr | = NameorAny "[" position "]" "[" "@" att-name "=" <'> att-value <'> "]" |
| NameorAny | = QName / "*"   ; QName from XML Namespaces |
| att-name | = QName |
| att-value | = AttValue   ; from XML specification |
| attribute-selector | = "@" att-name |

For example, when in the friends.xml document in Table 3, a location of a <list> element having a name of my_friends among <list> elements which are child elements of a <resource-lists> root element is to be specified, http:xcap.example.com/services/resource-lists/users/sip: jay@example.com/friends.xml/~~/resource-lists/list [@name="my_friends"] and this becomes an XCAP URI of the <list> element the value of whose 'name' attribute is "my$_{13}$friends".

An owner of the shared URI list stored in the shared XDMS 120 is a user who has created the list. Accordingly, modification, deletion, and utilization of the shared URI list are unique rights of the user possessing the list. For example, a user identified by sip:jay@example.com has created the friends.xml document in Table 3 and becomes the owner of friends.xml, a resource-list document. As such, it is only the user, sip:jay@example.com, who can modify the contents of the document, utilize the document, and delete the document.

Meanwhile, as described above, the shared URI list stored in the shared XDMS 120 may be referred to by several OMA services. A procedure of creating the shared URI list and utilizing it through a reference in OMA services will be described with reference to the accompanying drawings.

Figure 2:
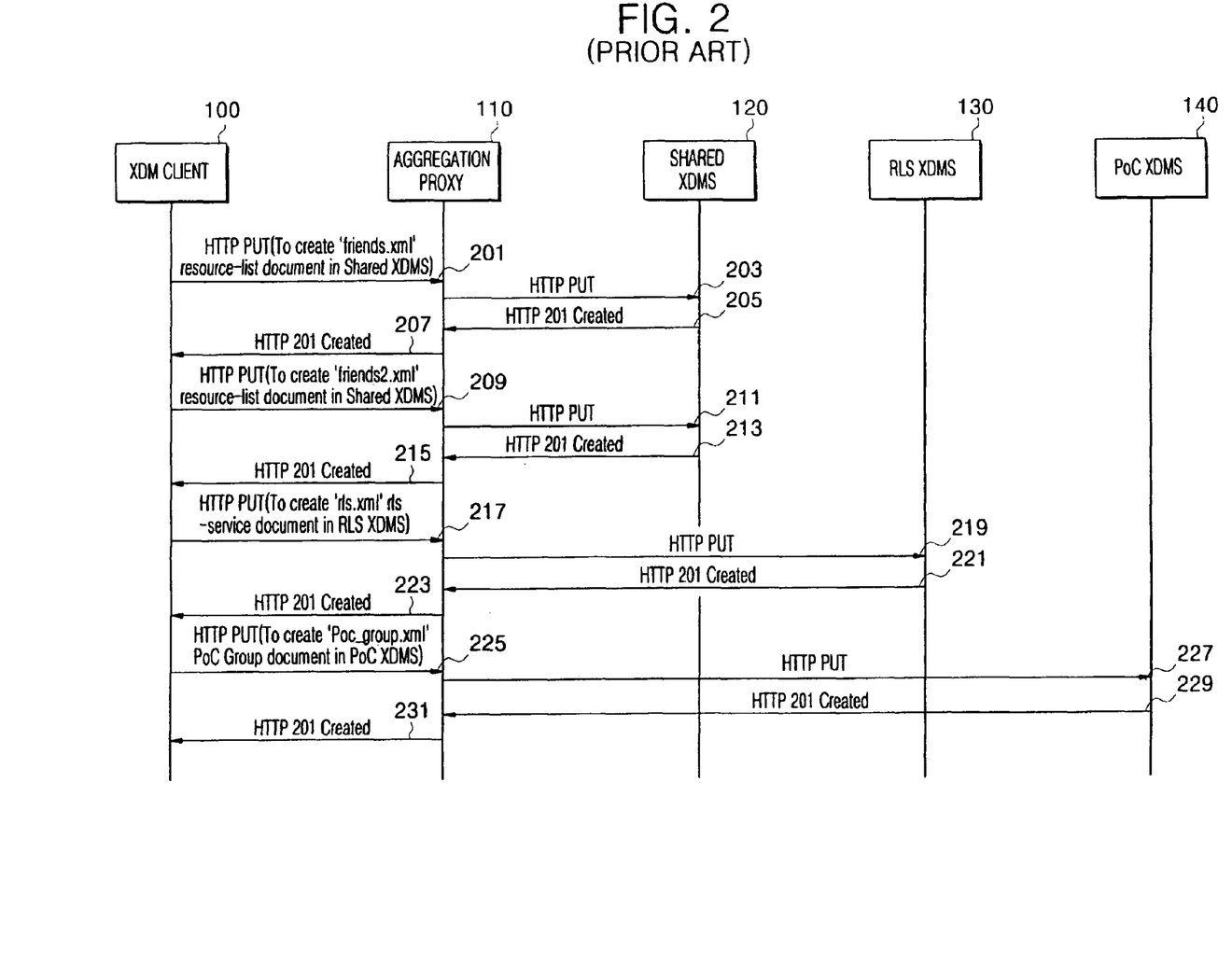
FIG. 2 is a flow diagram illustrating a conventional procedure for creating and utilizing a shared URI list.

FIG. 2 illustrates an example of a procedure for creating and utilizing a shared URI list. As shown in FIG. 2, the user, i.e., the XDM client 100, creates its shared URI lists in the form of a resource-list document as shown in Table 3, and stores the lists in a prescribed location or the user directory of the user within the shared XDMS 120 using an HTTP PUT message of an XCAP protocol. The Request URI of the HTTP PUT message is the document selector of XCAP URI, which is; http://xcap.example.com/services/resource-lists/users/sip:jay@example.com/friends.xml. The HTTP PUT message is first sent to the aggregation proxy 110 (201). The aggregation proxy 110 then routes the message to the shared XDMS 120 using the application ID of the "resource-lists", which is specified within the above XCAP URI (203). Then, the HTTP PUT message is used for requesting the shared XDMS 120 to create the friends.xml document under the user directory named with the XUI of sip:jay@example.com. Further, the user creates friends2.xml document referring to friends.xml and provides it to the shared XDMS 120 (209 and 211), creates an rls.xml document referring to the friends.xml document and provides the rls.xml document_to the RLS XDMS 130 (217 and 219), and creates a poc_group.xml document referring to the friends.xml and provides the a poc_group.xml document_to the PoC XDMS 140 (225 and 227). The creation of the friends2.xml, rls.xml, and poc_group.xml documents is performed through the aggregation proxy 110. HTTP201 Created response messages 205, 207, 213, 215, 221, 223, 229, and 231 are sent to the user to indicate the successful creation of each document.

The shared URI lists created in the shared XDMS 120 can be referenced by <external> element, <resource-list> element, or <entry-ref> element. <external> element is used to refer to a <list> element in shared URI lists which indicates a group of shared members. Similarly to <external> element, <resource-list> element is used to refer to a <list> element indicating the shared group, but can only be utilized in an RLS Service[RLS_XDM]. <entry-ref> element is used to refer to the <entry> element in shared URI lists which indicate a shared member. These referencing elements enable the shared URI lists to be referenced or utilized in OMA services including the shared XDMS 120 itself. Additionally, these referencing elements act as a type of pointer to the shared URI list in the shared XDMS 130. Resolution for a <list> element and an <entry> element in the shared URI list referred to through the pointers is made by the respective subjects (e.g., PoC server or RLS server) that actually use the service.

Table 5 to 7 shows examples of the above described reference mechanism.

TABLE 5

Example resource-list document in Shared XDMS, named friends2.xml

<?xml version="1.0" encoding="UTF-8"?>
  <resource-lists xmlns="urn:ietf:params:xml:ns:resource-lists"
          xmlns:xsi="http://www.w3.org/2001/XMLSchema-instance">
    <list name="list1">
      <display-name>Applied List 1</display-name>
      <entry uri="sip:member1@example.com"/>
      <list name="nested_list1">
        <entry uri="nested_member1@example.com"/>
        <entry uri="nested_member2@example.com"/>
      </list>
      <entry-ref ref="resource-lists/users/sip:jay@example.com/
friends.xml/--/resource-lists/list[@name="my_friends"]
/entry[@uri="sip:brian@example.com"]">
        <display-name>Pointer to entry element at my_friends.xml</display-name>
      </entry-ref>
      <external anchor="http://xcap.example.com/services/
resource-lists/users/sip:jay@example.com/friends.xml/--/
resource-lists/list[@name="other_friends"]">
        <display-name>Pointer to list element at my_friends.xml</display-name>
      </external>
    </list>
  </resource-lists>

TABLE 6

Example rls document in RLS XDMS, named rls.xml

<?xml version="1.0" encoding="UTF-8"?>
  <rls-services xmlns="urn:ietf:params:xml:ns:rls-services"
          xmlns:rl="urn:ietf:params:xml:ns:resource-lists"
          xmlns:xsi="http://www.w3.org/2001/XMLSchema-instance">
    <service uri="sip:rls-service1@example.com">
      <resource-list>http://xcap.example.com/services/resource-lists/
users/sip:jay@example.com/friends.xml/--/
resource-lists/list[@name="other_friends"]</resource-list>
      <packages>
        <package>presence</package>
      </packages>
    </service>
    <service uri="sip:marketing@example.com">
      <list name="marketing">
        <rl:entry uri="sip:joe@example.com"/>
        <rl:entry uri="sip:sudhir@example.com"/>
        <rl:entry-ref ref="resource-lists/users/sip:jay@example.com/
friends.xml/--/resource-lists/list[@name="my_friends"]
/entry[@uri="sip:brian@example.com"]">
        </entry-ref>
        <rl:external anchor="http://xcap.example.com/services/
resource-lists/users/sip:jay@example.com/friends.xml/--/
resource-lists/list[@name="other_friends"]">
        </external>

TABLE 6-continued

Example rls document in RLS XDMS, named rls.xml

```
    </list>
    <packages>
      <package>presence</package>
    </packages>
  </service>
</rls-services>
```

TABLE 7

Example PoC group document in PoC XDMS, named poc_group.xml

```
<?xml version="1.0" encoding="UTF-8"?>
<group xmlns="urn:oma:params:xml:ns:listservice"
       xmlns:rl="urn:ietf:params:xml:ns:resource-lists"
       xmlns:cr="urn:oma:params:xml:ns:common-policy">
    <list-service uri="sip:myconference@example.com">
        <list>
            <entry uri="tel:443012345618"/>
            <entry uri="sip:hermione.blossom@example.com"/>
            <external anchor="http://xcap.example.com/services/
resource-lists/users/sip:jay@example.com/friends.xml/--/
recource-lists/list[@name="other_friendes"]">
            </external>
        </list>
        <display-name xml:lang="en-us">Friends</display-name>
        <max-participant-count>10</max-participant-count>
        <cr:ruleset>
            <cr:rule id="a7c">
                <cr:conditions>
                    <is-list-member/>
                </cr:conditions>
                <cr:actions>
                    <join-handling>allow</join-handling>
                    <allow-anonymity>true</allow-anonymity>
                </cr:actions>
            </cr:rule>
        </cr:ruleset>
    </list-service>
</group>
```

Table 5 shows friends2.xml document in the shared XDMS 120, in which <entry-ref> element and <external> element are used to refer to <entry> element and <list> element in shared URI lists, respectively. More specifically, the shared URI list refers to the <list> element having a list name of 'other_friends' and to the <entry> element having the URI of 'sip:brian@example.com' in the shared URI lists named as the friends.xml, by using an <external> element and an <entry-ref> element, respectively.

Table 6 shows rls.xml document in the RLS XDMS 130, in which <entry-ref> element and <resource-list> element are used to refer to <entry> element and <list> element in shared URI lists, respectively. More specifically, the <service> element with the service URI of 'sip:rls-service1@example.com' refers, by using <resource-list> element, to the <list> element having the list name of 'other_friends' in the shared URI list stored in the friends.xml resource-list document in the shared XDMS 120. Similarly, the <service> element with the service URI of 'sip:marketing@example.com' refers to the <list> element having the list name of 'other_friends' in the shared URI list stored in the friends.xml resource-list document by using <external> element, and refers to the <entry> element having the URI of 'sip:brian@example.com' in the shared URI list stored in the friends.xml resource-list document by using the <entry-ref> element.

Table 7 shows poc_group.xml document in the PoC XDMS 140, in which <entry-ref> element and <resource-list> element are used to refer to <entry> element and <list> element in shared URI lists, respectively. More specifically, the PoC group member listing refers, by using the <external> element, to the <list> element having a list name 'other_friends' in the shared URI list stored in the friends.xml resource-list document in the shared XDMS 120.

The following describes reference handle with respect to the above examples.

The XML schema definition for the <external> element and the <entry-ref> element is shown in Table 1. The <external> element refers to a <list> element by specifying the absolute XCAP URI of the <list> element to be referred, which is entire path to the element. For example, in Table 5, the location of the <list> element in the shared URI list referred to by the <external> element is specified by an absolute XCAP URI of:

http://xcap.example.com/services/resource-lists/users/sip:jay@example.com/friends.xml/~~/resource-lists/list[≠name="other_friends"].

In the example, the <list> element to be referred to among other <list> elements in the shared URI list is identified by the value of "name" attribute or by the name of the <list> element, which is 'other_friends'. This part that identifies the exact location of the element to be referred is called as reference handle. Therefore, the value of name attribute of XCAP URI in <external> element, which is 'other_friends' in this case, becomes the reference handle of <external> element. The same is applied to <resource-list> element of an RLS service document in Table 6.

The <entry-ref> element refers to an <entry> element by specifying the relative XCAP URI of the <entry> element to be referred. The relative XCAP URI is the path that excludes [XCAP Root URL] from the absolute XCAP URI indicating the entire path to the <entry> element. Therefore, the reference by <entry-ref> element can be made only when the [XCAP Root URI] of the referring <entry-ref> element is same as that of the referred <entry> element.

For example, the RLS XDMS 130 storing the rls.xml RLS service document of Table 6 has the same [XCAP Root URL] of 'http://xcap.example.com/services' as the shared XDMS 120 which stores the friends.xml shared URI list document of Table 3. Therefore, <entry-ref> element in the rls.xml can refer to <entry> element in the friends.xml. In the example, the <entry-ref> element contains the relative XCAP URI of the referring <entry> element with the URI of 'sip:brian@example.com', which is:

resource-lists/users/sip:jay@example.com/friends.xml/~~/resource-lists/list[@name=my_friends]/entry[@uri="sip:brian@example.com"].

The value of 'uri' attribute of the relative XCAP URI in <entry-ref> element, which is 'sip:brian@example.com' in the example, becomes the reference handle of <entry-ref> element, because this identifies the exact location of the <entry> element being referred.

As described above, the shared URI list stored in the shared XDMS 120 is utilized for the OMA service in a manner that the shared URI list is referred to through location designation using the <external> element, <resource-list> element, and <entry-ref> element. In this case, the reference handle for location designation is a list name of the referred <list> element in the case of the <external> element and the <resource-list> element, and is a URI of the referred <entry> element in the case of an <entry-ref> element.

While these reference handles of list name and URI value are the key to form the reference relationship between shared URI list and OMA services, it is observed that they are subject to change at the discretion of the user who possesses the shared URI list because the user owning the shared URI list can modify the contents of the corresponding shared URI list through an HTTP PUT based replacement operation whenever desired. However, if the owning user modifies the value of name attribute of the <list> element or that of uri attribute of the <entry> element, all the reference relationship between the shared URI list and other OMA services that have been made regarding the <list> element or <entry> element have to be updated accordingly, as the value of name attribute or uri attribute works as reference handle. Otherwise, the reference relationship between the shared URI list and objects in other OMA services utilizing the shared URI list becomes broken and the objects can no longer utilize the shared URI list.

That is, when values of the "name" attribute and the "uri" attribute, which are reference handles are changed, reference handle values of the <external> element, the <resource-list> element, and the <entry-ref> element respectively corresponding to the shared XDMS 120, the RLS XDMS 130, and the PoC XDMS 140, which are all referring objects, should be updated together to maintain the reference relationship of the shared URI list with the shared XDMS 120, the RLS XDMS 130, and the PoC XDMS 140. Accordingly, modification of reference handle for the referred shared URI list requires separate signaling for update of the referring shared XDMS 120, RLS XDMS 130, and PoC XDMS 140.

Figure 3:
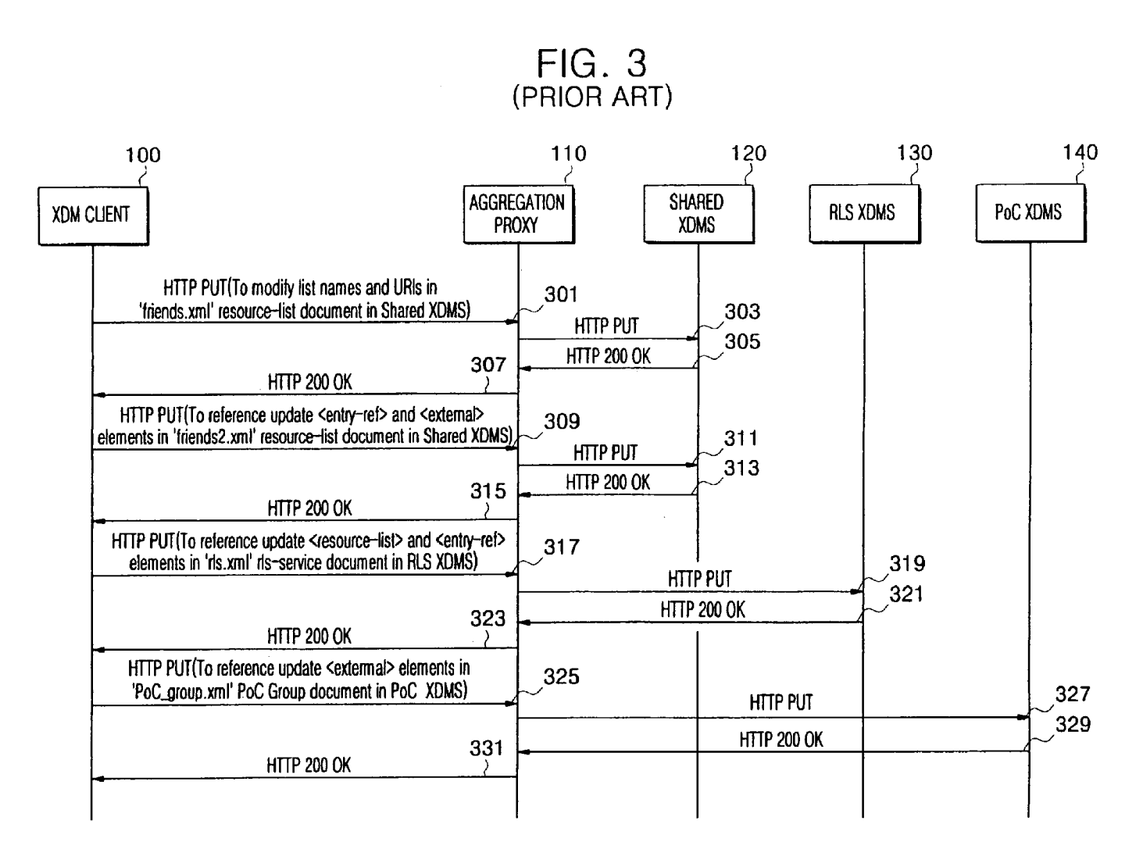
FIG. 3 is a flow diagram illustrating a conventional signaling process for changing a reference handle of a shared URI list.

FIG. 3 illustrates a signaling for reference update in the shared XDMS, the RLS XDMS, and the PoC XDMS when a reference handle of a shared URI list is changed. The reference update is also performed through the aggregation proxy 110 for the purpose of routing update request to the corresponding XDMS. The user changes the friends.xml document stored in the shared XDMS 120 (301 and 303), changes the friends2.xml document (309 and 311), changes the rls.xml document (317 and 319), and changes the poc_group.xml document (325 and 327). HTTP 200 OK 305, 307, 313, 315, 321, 323, 329, and 331 are response messages. However, since it uses a variable reference handle as described above, the conventional technology has a number of problems.

For example, additional signalings are required to update references of all referring objects in proportion to a utilization degree of referring to the shared URI list in the shared XDMS, which makes an XDMS relationship complex and wastes system resources for additional signaling.

Further, when reference update signaling for referring objects according to a change in the reference handle fails for a certain reason, the referring objects can no longer refer to the shared URI list. This causes an interoperability problem.

Additionally, information about objects referring to the shared URI list needs to be kept in order to suitably update the reference according to change in the shared URI list. As a result, system resources are consumed.

SUMMARY OF THE INVENTION

Accordingly, it is an object of the present invention to provide a system and method for managing XDM (XML Document Management) service information in an OMA (Open Mobile Alliance) service system, which are capable of preventing signaling overhead, compatibility degradation, and resource waste caused by a change in a reference handle.

According to the present invention, there is provided an apparatus for managing XDM service information in an XDM client of an OMA system, the apparatus including a controller for creating a shared user resource identifier (URI) list using a value that the controller creates as a reference handle in response to a request to create the URI list.

According to the present invention, there is provided a system for managing XDM service information in an OMA system, the managing system including a shared XDMS (XML Document Management System) for storing a shared URI list which is shared among a plurality of OMA services; and an XDM client for creating the shared URI list using a value the XDM client creates as a reference handle and transmitting the shared URI list to the shared XDMS, and for creating XDMS service information referring to the shared URI list using the reference handle and transmitting the XDMS service information to the shared XDMS.

According to the present invention, there is provided a method for managing XDM service information in an XDM client of an OMA system, the method including receiving a request to create a shared URI list to be stored in a shared XDM server; creating a value to be used as a reference handle; and creating the shared URI list using the created value as the reference handle in response to the request.

BRIEF DESCRIPTION OF THE DRAWINGS

The above and other objects, features, and advantages of the present invention will be more clearly understood from the following detailed description, taken in conjunction with the accompanying drawings, in which.

DETAILED DESCRIPTION OF PREFERRED EMBODIMENTS

As described above, the present invention is characterized by the use of an unchanged reference handle. That is, in accordance with the present invention, a value of the reference handle that the OMA service uses to utilize the shared URI list stored in the shared XDMS is a static value that remains unchanged after the referred element is created and before the reference handle vanishes.

When a static reference handle is used, the relationships between a change in referred objects, i.e., the <list> element and the <entry> element, and referring objects, i.e., the <external> element, the <resource-list> element, and the <entry-ref> element, are independent. Accordingly, an internal change in the referred objects does not affect the reference relationship with the referring objects.

While a reference handle used in the present invention can be created by several methods, the following description will focus primarily on a representative method of creating a reference handle, wherein a system managing a shared URI list uses a random value which is automatically created in response to a user's request.

The present invention may be implemented using a conventional OMA presence architecture as illustrated in FIG. 1.

Tables 8 and 9 illustrate a (single) definition of enhanced XML schema of resource-list in Table 1 and 2, according to the present invention. More specifically, Tables 8 and 9 show a definition of XML schema for using a random value as a reference handle.

TABLE 8

Improved XML schema for resource-list; part 1

```
<?xml version="1.0" encoding="UTF-80"?>
  <xs:schema targetNamespace="urn:ietf:params:xml:ns:resource-lists"
    xmlns="urn:ietf:params:xml:ns:resource-list"
    xmlns:xs="http://www.w3.org/2001/XMLSchema"
    elementFormDefault="qualified" attributeFormDefault="unqualified">
    <xs:import namespace="http://www.w3.org/XML/1998/namespace"
      schemaLocation="http://www.w3.org/2001/xml.xsd"/>
    <xs:complexType name="listType">
      <xs:sequence>
        <xs:element name="name" type="xs:string" minOccurs="0"/>
        <xs:element name="display-name" type="display-nameType"
  minOccurs="0"/>
        <xs:sequence minOccurs="0" maxOccurs="unbounded">
          <xs:choice>
            <xs:element name="list">
              <xs:complexType>
                <xs:complexContent>
                  <xs:extension base="listType"/>
                </xs:complexContent>
              </xs:complexType>
            </xs:element>
            <xs:element name="external" type="externalType"/>
            <xs:element name="entry" type="entryType"/>
            <xs:element name="entry-ref" type="entry-refType"/>
            <xs:any namespace="##other" processContents="lax"
              minOccurs="0"
              maxOccurs="unbounded"/>
          </xs:choice>
        </xs:sequence>
        <xs:any namespace="##other" minOccurs="0"
          maxOccurs="unbounded"/>
      </xs:sequence>
      <xs:attribute name="id" type="xs:string" use="required"/>
      <xs:anyAttribute namespace="##other"/>
    </xs:complexType>
  <xs:complexType name="entryType">
    <xs:sequence>
      <xs:element name="uri" type="xs:anyURI"/>
      <xs:element name="display-name" minOccurs="0">
        <xs:complexType>
          <xs:simpleContent>
            <xs:extension base="display-nameType"/>
          </xs:simpleContent>
        </xs:complexType>
      </xs:element>
      <xs:any namespace="##other" processContents="lax"
        minOccurs="0"
        maxOccurs="unbounded"/>
    </xs:sequence>
    <xs:attribute name="id" type="xs:string" use="required"/>
    <xs:anyAttribute namespace="##other"/>
  </xs:complexType>
```

TABLE 9

Improved XML schema for resource-list; part 1

```
  <xs:complexType name="entry-refType">
    <xs:sequence>
      <xs:element name="display-name" type="display-nameType"
  minOccurs="0"/>
      <xs:any namespace="##other" minOccurs="0"
        maxOccurs="unbounded"/>
    </xs:sequence>
    <xs:attribute name="ref" type="xs:anyURI" use="required"/>
    <xs:anyAttribute namespace="##other"/>
  </xs:complexType>
```

TABLE 9-continued

Improved XML schema for resource-list; part 1

```
  <xs:complexType name="externalType">
    <xs:sequence>
      <xs:element name="display-name" type="display-nameType"
  minOccurs="0"/>
      <xs:any namespace="##other" minOccurs="0"
        maxOccurs="unbounded"/>
    </xs:sequence>
    <xs:attribute name="anchor" type="xs:anyURI"/>
    <xs:anyAttribute namespace="##other"/>
  </xs:complexType>
  <xs:element name="resource-lists">
    <xs:complexType>
      <xs:sequence maxOccurs="unbounded">
        <xs:element name="list" type="listType"/>
      </xs:sequence>
    </xs:complexType>
  </xs:element>
  <xs:complexType name="display-nameType">
    <xs:simpleContent>
      <xs:extension base="xs:string">
        <xs:attribute ref="xml:lang"/>
      </xs:extension>
    </xs:simpleContent>
  </xs:complexType>
</xs:schema>
```

As shown in Tables 8 and 9, the enhanced XML schema according to the present invention defines a "name" attribute that is the list name of the <list> element, which was defined in the conventional schema in Table 1, as a child element of the <list> element, and additionally defines a new attribute "id" of a string type in the <list> element. This "id" attribute contains a random value that the system automatically allocates to the <list> element upon creating the <list> element. This "id" attribute should be unique among other <list> elements belonging to the same parent element in the shared URI list, and should remain unchanged before the <list> element vanishes. That is, this "id" attribute allows the <list> element to be uniquely identified in the resource-list document. In the present invention, this "id" attribute is used as a reference handle of the <external> element and the <resource-list> element used to refer to the <list> element.

As described above, when the reference handle is used, only the <name> child element of the <list> element is changed and the "id" attribute that is used as a reference handle of the <list> element is kept unchanged even though the user changes the list name of the shared URI list later. Accordingly, objects referring to the <list> element by using the "id" attribute as reference handle do not require the reference to be additionally updated according to the change in the list name of the shared URI list.

Further, a "uri" attribute indicating the URI value of the <entry> element, which was defined in the conventional XML schema of Table 1, is defined as the child element of the <entry> element in the enhanced XML schema of Tables 8 and 9, and a new attribute "id" of a string type is additionally defined in the <entry> element. This "id" attribute is a random value that is automatically allocated to the <entry> element of the system upon creation of the <entry> element, as in the above-described <list> element. The "id" attribute should be unique among other <entry> elements belonging to the same parent element in the shared URI list, and should remain unchanged until the <entry> element vanishes. As indicated above, the "id" attribute allows the <entry> element to be uniquely identified within the resource-list document, and is used as a reference handle of the <entry-ref> element, which is used to refer to the <entry> element.

Accordingly, only the <uri> child element of the <entry> element can be changed and the "id" attribute that is the reference handle of the <entry> element should remain unchanged, even if the user changes a URI of the shared member later. Accordingly, objects referring to the <entry> element by using the "id" attribute as reference handle do not require the reference to be additionally updated according to the change in the URI of member in the shared URI list.

Table 10 shows enhancement of the conventional friends.xml resource-list document of Table 2, created according to the enhanced XML schema of the examples of Tables 8 and 9.

TABLE 10

Example of improved resource-list document in Shared XDMS, named friends.xml

```
<?xml version="1.0" encoding="UTF-8"?>
    <resource-lists xmlns="urn:ietf:params:xml:ns:resource-lists"
            xmlns:xsi="http://www.w3.org/2001/XMLSchema-instance">
      <list id="sp93">
        <name>my_friends</name>
        <display-name>My Friends</display-name>
        <entry id="ue23f">
           <uri>sip:brian@example.com</uri>
           <display-name>Brian Oh</display-name>
        </entry>
        <entry id="e21w">
           <uri>sip:alex@example.com</uri>
           <display-name>Alex Cho</display-name>
        </entry>
      </list>
      <list id="vn12w">
        <name>other_friends</name>
        <display-name>Other Friends</display-name>
        <entry id="2pe3">
           <uri>sip:joe@example.com</uri>
           <display-name>Joe Smith</display-name>
        </entry>
        <entry id="w2fb7">
           <uri>sip:nancy@example.com</uri>
           <display-name>Nancy Gross</display-name>
        </entry>
      </list>
    </resource-lists>
```

Table 10 shows an example according to the present invention in which lists and entries in the friends.xml document uses the randomly created "id" attribute values of sp93, e21w, vn12w, and w2fb7 as reference handles. Accordingly, friends.xml in Table 10, no longer uses the name or uri attribute values as reference handle, because they are subject to change at the discretion of the user owning friends.xml. As such, reference handles of friends.xml, which are introduced according to the present invention, do not change even when shared URI list service information is changed by the user.

As described above, in the present invention, since the reference handle does not changes (i.e., it remains the same), additional reference update of objects referring to the corresponding shared URI list according to the change in the reference handle is not required any more. Accordingly, with the present invention, signaling overhead due to reference update is not required any more.

In addition, system is simplified and its performance is improved since the reference update is not required. Further, with the present invention, the conventional problem of interoperability degradation due to failure of reference update does not occur any more.

Further, according to the present invention, it is unnecessary to maintain information about the reference relationship of the shared URI list for possible reference update, and thus system resources are not wasted.

Tables 11 to 13 show examples of an improved resource-list document of a shared XDMS, an improved rls-services document for RLS Service, and an improved PoC Group document for PoC Service, respectively, according to this invention. In Tables 11 to 13, all the reference relationships of those documents are improved by referring to the improved shared URI lists of friends.xml in Table 10, which is created according to the enhanced XML schema in Table 9.

TABLE 11

Example of improved resource-list document in Shared XDMS, named friends2.xml

```
<?xml version="1.0" encoding="UTF-8"?>
    <resource-lists xmlns="urn:ietf:params:xml:ns:resource-lists"
            xmlns:xsi="http://www.w3.org/2001/XMLSchema-instance">
      <list id="sf98s">
        <name>list1</name>
        <display-name>Applied List 1</display-name>
        <entry id="rowjw2">
           <uri>sip:member1@example.com</uri>
        </entry>
        <list id="bk1083">
           <name>nested_list1</name>
           <entry id="uiw0">
              <uri>nested_member1@example.com</uri>
           </entry>
           <entry id="uiw1">
              <uri>nested_member2@example.com</uri>
           </entry>
        </list>
        <entry-ref ref="resource-lists/users/sip:jay@example.com/
friends.xml/~~/resource-lists/list[@id="sp93"]/entry[@id="ue23f"]">
           <display-name>Pointer to entry element at my_friends.xml</display-name>
        </entry-ref>
        <external anchor="http://xcap.example.com/services/
resource-lists/users/sip:jay@example.com/friends.xml/~~/
resource-lists/list[@id="vn12w"]">
           <display-name>Pointer to list element at my_friends.xml</display-name>
        </external>
      </list>
    <resource-lists>
```

TABLE 12

Example of improved rls document in RLS XDMS, named rls.xml

```
<?xml version="1.0" encoding="UTF-8"?>
  <rls-services xmlns="urn:ietf:params:xml:ns:rls-services"
            xmlns:rl="urn:ietf:params:xml:ns:resource-lists"
            xmlns:xsi="http://www.w3.org/2001/XMLSchema-
            instance">
    <service uri="sip:rls-service1@example.com">
       <resource-list>http://xcap.example.com/services/resource-lists/
users/sip:jay@example.com/friends.xml/~~/
resource-lists/list[@id="vn12w"]</resource-list>
       <packages>
         <package>presences</package>
       </packages>
    </service>
    <service uri="sip:marketing@example.com">
       <list id="bn2p3">
         <rl:name>marketing</rl:name>
         <rl:entry id="ip302">
            <uri>sip:joe@example.com</uri>
         </rl:entry>
         <rl:entry id="gp20b">
<uri>sip:sudhir@example.com</uri>
</rl:entry>
```

TABLE 12-continued

Example of improved rls document in RLS XDMS, named rls.xml

```
<rl:entry-ref ref="resource-lists/uesrs/sip:jay@example.com/
friends.xml/--/resource-lists/list[@id="sp93"]/entry[@id="ue23f"]"/>
        <rl:external anchor="http://xcap.example.com/services/
resource-lists/users/sip:jay@example.com/friends.xml/~~/
resource-lists/list[wid="vn12w"]"/>
        </list>
        <packages>
            <package>presence</package>
        </packages>
    </service>
<rls-services>
```

TABLE 13

Example of improved PoC group document in PoC XDMS, named poc_group.xml

```
<?xml versions="1.0" encoding="UTF-8"?>
<group xmlns="urn:oma:params:xml:ns:listservice"
       xmlns:rl="urn:ietf:params:xml:ns:resource-lists"
       xmlns:cr="urn:oma:params:xml:ns:common-policy">
<list-service uri="sip:myconference@example.com">
    <list>
        <entry id="gl293">
            <uri>tel:+13012345678</uri>
        </entry>
        <entry id="9tj23">
            <uri>sip:hermione.blossom@example.com</uri>
        </entry>
        <external anchor="http://xcap.example.com/services/
resource-lists/users/sip:jay@example.com/friends.xml/~~/
resource-lists/list[@id="vn12w"]">
        </external>
    </list>
    <display-name xml:lang="en-us">Friends</display-name>
    <max-participant-count>10</max-participant-count>
    <cr:ruleset>
        <cr:rule id="a7c">
            <cr:conditions>
                <is-list-member/>
            </cr:conditions>
            <cr:actions>
                <join-handling>allow</join-handling>
                <allow-anonymity>true</allow-anonymity>
            </cr:actions>
        </cr:rule>
    </cr:ruleset>
</list-service>
</group>
```

The examples of Tables 11 to 13 show the enhanced versions of the "name" attribute, the "uri" attribute, and the reference handles in the examples shown in Tables 5 to 7.

Alternatively, the concept of reference handle used in the present invention can be achieved by improving the existing reference handles of 'name' attribute of <list> element and 'uri' attribute of <entry> element. However, as noted above, the respective value of 'name' attribute or 'uri' attribute shall be unique among those of other <list> element or <entry> element because this enables the unique identification of the corresponding <list> or <entry> element. As indicated above, the problems of the prior art are that these values are subject to change, and the existence of 'name' attribute is optional according to the schema definition in Table 1. Therefore, if the value of 'name' attribute or 'uri' attribute is required to be static and the existence of 'name' attribute is mandatory, i.e., a <list> element shall always contain the 'name' attribute, the static reference mechanism as presented by this invention can be achieved by modifying the existing reference handles.

The signaling flow of creating and referring to a shared URI list according to the present invention is the same as illustrates in FIG. 2. That is, the created shared URI list is stored in the shared XMLS, and XDM service information (resource-list document), RLS service information (RLS service document) and PoC service information (PoC service document) referring to the shared URI list are stored in the shared XDMS, RLS XDMS, and PoC XDMS, respectively. Service information stored in the shared XDMS, RLS XDMS, and PoC XDMS are created by the enhanced XML schema according to the present invention. That is, the service information stored in the shared XDMS, RLS XDMS, and PoC XDMS refers to the shared URI list using the randomly created reference handle.

Meanwhile, in the present invention, even when there is a change in the shared URI list, the reference handle is kept unchanged. Accordingly, even when there is a change in a shared URI list, reference update of objects referring to the shared URI list is not required.

Figure 4:
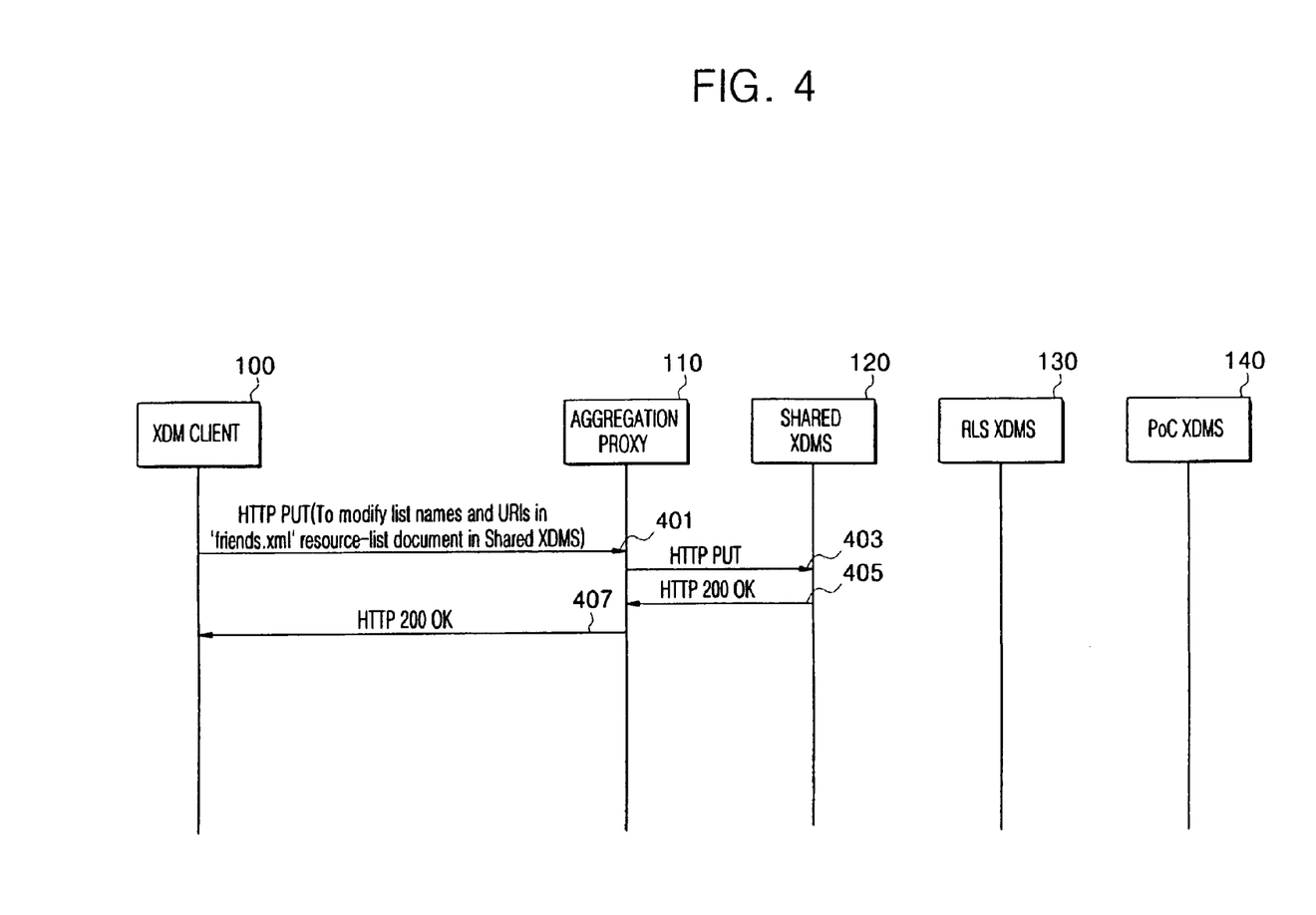
FIG. 4 is a flow diagram illustrating a signaling process for changing a shared URI list according to the present invention.

FIG. 4 is a flow diagram illustrating a signaling process for changing a shared URI list according to the present invention. As illustrated in FIG. 4, in the present invention, even when a shared URI list of the shared XDMS 120 is changed by the user, i.e., the XDM client 100 (401 and 403), reference updates for the other XDMSs 120, 130, 140, and 150 are not performed. In FIG. 4, an HTTP 200 OK (405 or 407) is a response message.

Meanwhile, the process for creating the reference handle as described above is generally performed at the XDM client because the shared URI list is created at the XDM client and transmitted to the shared XDMS. The process of creating the shared URI list at the XDM terminal according to the present invention will be described with reference to the accompanying drawings.

Figure 5:
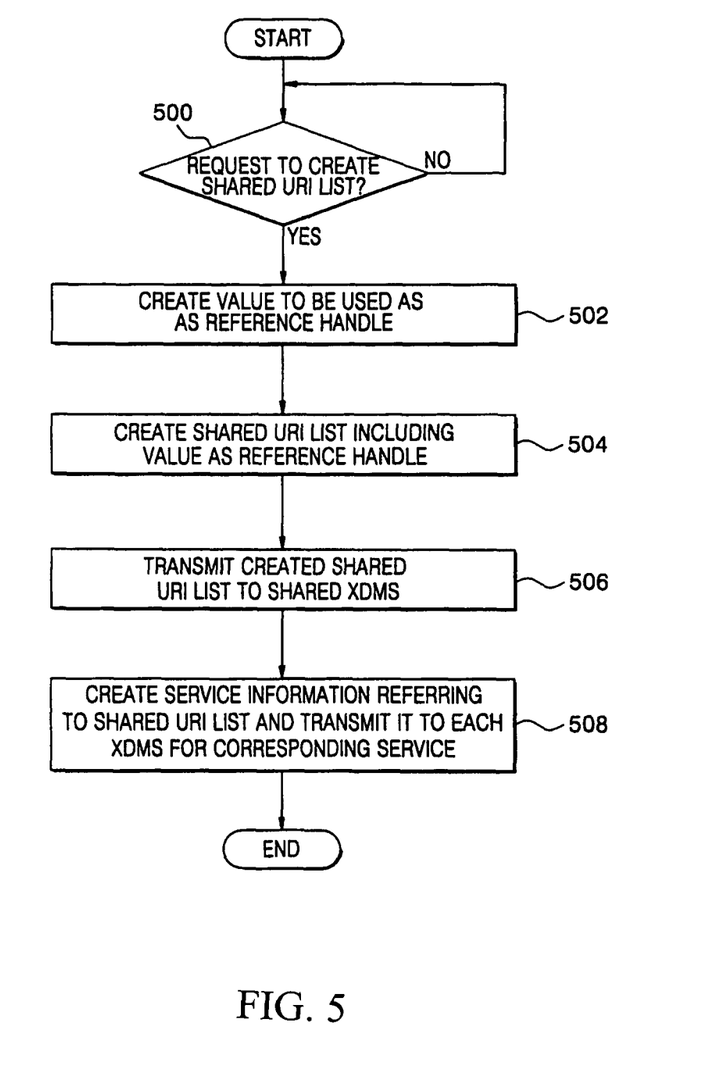
FIG. 5 is a flowchart showing a process of creating a shared URI list in an XDM client according to the present invention.

FIG. 5 is a flowchart illustrating a process of creating a shared URI list at an XDM client according to the present invention.

As illustrated in FIG. 5, upon receipt of a request to create a shared URI list (500), the XDM client creates a reference handle in a corresponding shared URI list (502). Generally, a random value is used as the reference handle. The XDM client creates the shared URI list including the created reference handle (504). The XDM client transmits the created shared URI list to the shared XDMS (506). The XDM client creates service information referring to the created shared URI list and transmits it to each XDMS for corresponding service (508).

In the present invention, the reference handle value is, for the most part, meaningless to the user and is not notified to the user upon utilization of the shared URI list based on the reference for the OMA service. Accordingly, when the user requests a reference relationship, an operation for substantial reference is automatically performed and maintained by the system, i.e., the XDM client, the shared XDMS, the PoC XDMS, and the RLS XDMS.

According to the present invention, OMA services can stably refer to shared service information by creating a value that is not changed until the shared service information is deleted, and by using it as a reference handle in referring to the shared service information. Therefore, signaling overhead, compatibility degradation, and resource waste can be prevented, and system performance can be improved.

While the present invention has been shown and described with reference to exemplary embodiments thereof, it will be understood by those skilled in the art that various changes in from and detail may be made therein without departing from the scope of the present invention as defined by the following claims.

What is claimed is:

1. An apparatus for managing XML Document Management (XDM) service information in an XDM client included in a user terminal of an Open Mobile Alliance (OMA) system, the apparatus comprising:
a controller for creating a shared User Resource Identifier (URI) list including a static reference handle value for indicating the shared URI list, in response to a request to create the shared URI list, transmitting the shared URI list to a shared XDM Server (XDMS) for storage as a reference for service information corresponding to a plurality of OMA services in accordance with the static reference handle value, changing at least one piece of the service information, and maintaining, at the shared XDMS, the static reference handle value for the shared URI list after the at least one piece of the service information is changed;
a receiving device for receiving the request to create the shared URI list and receiving an error message, if the XDM client proposes a creation of the shared URI list without the static reference handle value from an XDMS; and
a transmitting device for transmitting the shared URI list to the shared XDMS,
wherein the service information is at least one of RLS (Resource List Server) service information, PoC (Push-to-Talk over Cellular) service information, and XDM service information, and
wherein the XDM client creates the PoC service information, used to provide a PoC group service, referring to the shared URI list by using the static reference handle value of the shared URI list, and transmits the PoC service information to a PoC XDMS.

2. The apparatus of claim 1, wherein the static reference handle value is a random value.

3. The apparatus of claim 1, wherein the shared URI list is created using an XML Configuration Access Protocol (XCAP).

4. The apparatus of claim 1, wherein the controller creates the service information using the static reference handle value; and
wherein the transmitting device transmits the service information to each XDM server for corresponding service.

5. The apparatus of claim 1, wherein the static reference handle value is a name attribute of the shared URI list.

6. A system for managing XDM (XML Document Management) service information in an OMA (Open Mobile Alliance) system, the system comprising:
a shared XDMS (XML Document Management Server) for storing a shared URI (Uniform Resource Identifier) list as a reference for service information corresponding to a plurality of OMA services, storing changes made to at least one piece of the service information, and maintaining the static reference handle value for the shared URI list after the at least one piece of the service information is changed;
an XDM client included in a user terminal for receiving a request to create the shared URI list, receiving an error message when the XDM client proposes a creation of the shared URI list without a static reference handle value from an XDMS, creating the shared URI list including the static reference handle value for identifying the shared URI list, transmitting the shared URI list to the shared XDMS, creating service information referring to the shared URI list using the reference handle value, transmitting the service information to a corresponding XDMS that stores such service information, and changing the at least one piece of the service information,
wherein the service information is at least one of RLS (Resource List Server) service information, PoC (Push-to-Talk over Cellular) service information, and XDM service information; and
a PoC XDMS for storing the PoC service information used to provide a PoC group service,
wherein the XDM client creates the PoC service information referring to the shared URI list by using the static reference handle value of the shared URI list, and transmits the PoC service information to the PoC XDMS.

7. The system of claim 6, further comprising:
an RLS (Resource List Server) XDMS for storing RLS service information,
wherein the XDM client creates the RLS service information referring to the shared URI list by using the static reference handle value of the shared URI list, and transmits the RLS service information to the RLS XDMS.

8. The system of claim 6, wherein the XDM client transmits a changed content of the shared URI list to the shared XDMS upon receipt of a request to change the shared URI list.

9. The system of claim 6, wherein the static reference handle value is randomly created.

10. A method for managing XDM (XML Document Management) service information in an XDM client included in a user terminal of an Open Mobile Alliance (OMA) system, the method comprising:
receiving a request, at the XDM client, to create a shared URI (Uniform Reference Identifier) list to be stored in a shared XDM Server (XDMS);
receiving an error message, if the XDM client proposes a creation of the shared URI list without a static reference handle value from an XDMS;
creating, by the XDM client, the shared URI list including the static reference handle value for identifying the shared URI list, in response to the request;
transmitting the shared URI list from the XDM client to the shared XDMS for storage as a reference for service information corresponding to a plurality of OMA services in accordance with the static reference handle value;
changing at least one piece of the service information; and
maintaining, at the shared XDMS, the static reference handle value for the shared URI list after the at least one piece of the service information is changed,
wherein the service information is at least one of RLS (Resource List Server) service information, PoC (Push-to-Talk over Cellular) service information, and XDM service information, and
wherein the XDM client creates the PoC service information, used to provide a PoC group service, referring to the shared URI list by using the static reference handle value of the shared URI list, and transmits the PoC service information to a PoC XDMS.

11. The method of claim 10, wherein the static reference handle value is randomly created.

12. The method of claim 10, further comprising transmitting the created shared URI list to the shared XDM (XML Document Management) server.

13. The method of claim 10, further comprising creating the service information using the static reference handle value and transmitting the service information to each XDM server for corresponding service.

14. The method of claim 10, further comprising transmitting changed content of the shared URI list to a shared XDM server, upon receipt of a request to change the shared URI list.

15. The method of claim 10, wherein the static reference handle value is a name attribute of the shared URI list.

16. The method of claim 10, further comprising receiving an error message, if the XDM client proposes a creation of the shared URI list without the static reference handle value.

17. The method of claim 10, wherein the static reference handle value conforms to uniqueness constraints in an XML Configuration Access Protocol (XCAP).

18. The method of claim 10, wherein the static reference handle value is used as a reference handle of an external element and a resource-list element in the shared URI list.

19. A method for managing XDM (XML Document Management) service information in an XDM client included in a user terminal of an Open Mobile Alliance (OMA) system, the method comprising:
- receiving, at the XDM client, a request to create a shared URI list to be stored in a shared XDM Server (XDMS);
- receiving an error message, if the XDM client proposes a creation of the shared URI list without a list name from an XDMS;
- creating, by the XDM client, the shared URI list including the list name;
- statically fixing the list name of the shared URI list by the XDM client;
- transmitting the shared URI list including the statically fixed list name from the XDM client to the shared XDMS for storage as a reference for service information corresponding to a plurality of OMA services in accordance with the statically fixed list name;
- changing at least one piece of the service information; and
- maintaining, at the shared XDMS, the statically fixed list name for the shared URI list after the at least one piece of the service information is changed,
- wherein the service information is at least one of RLS (Resource List Server) service information, PoC (Push-to-Talk over Cellular) service information, and XDM service information, and
- wherein the XDM client creates the PoC service information, used to provide a PoC group service, referring to the shared URI list by using the statically fixed list name of the shared URI list, and transmits the PoC service information to a PoC XDMS.

20. A method for managing XDM (XML Document Management) service information in an XDM client included in a user terminal of an Open Mobile Alliance (OMA) system, the method comprising:
- receiving, by the XDM client, a request to create a shared URI list including an entry element to be stored in a shared XDM Server (XDMS);
- receiving an error message, if the XDM client proposes a creation of the shared URI list without a unique identifier from an XDMS;
- creating, by the XDM client, the shared URI list including the entry element having the unique identifier;
- statically fixing the unique identifier of the entry element by the XDM client; and
- transmitting the shared URI list including the statically fixed unique identifier of the entry element from the XDM client to the shared XDMS for storage as a reference for service information corresponding to a plurality of OMA services in accordance with the statically fixed unique identifier;
- changing at least one piece of the service information; and
- maintaining, at the shared XDMS, the statically fixed unique identifier for the shared URI list after the at least one piece of the service information is changed;
- wherein the service information is at least one of RLS (Resource List Server) service information, PoC (Push-to-Talk over Cellular) service information, and XDM service information, and
- wherein the XDM client creates the PoC service information, used to provide a PoC group service, referring to the shared URI list by using the statically fixed unique identifier of the shared URI list, and transmits the PoC service information to a PoC XDMS.

* * * * *